United States Patent
Wieczorek et al.

(10) Patent No.: US 11,923,976 B2
(45) Date of Patent: Mar. 5, 2024

(54) METHOD FOR TRANSMITTING ANALYSIS-RELEVANT DATA, TRANSMITTER AND SYSTEM

(71) Applicant: SIEMENS AKTIENGESELLSCHAFT, Munich (DE)

(72) Inventors: Michael Wieczorek, Erlangen (DE); Elisabeth Heindl, Cadolzburg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1128 days.

(21) Appl. No.: 16/618,357

(22) PCT Filed: May 23, 2018

(86) PCT No.: PCT/EP2018/063436
§ 371 (c)(1),
(2) Date: Nov. 30, 2019

(87) PCT Pub. No.: WO2018/219723
PCT Pub. Date: Dec. 6, 2018

(65) Prior Publication Data
US 2021/0143935 A1  May 13, 2021

(30) Foreign Application Priority Data
May 30, 2017 (EP) ..................... 17173424

(51) Int. Cl.
*H04L 1/00* (2006.01)
(52) U.S. Cl.
CPC .......... *H04L 1/0033* (2013.01); *H04L 1/0002* (2013.01)
(58) Field of Classification Search
CPC .............. H04L 1/0033; H04L 1/0002
See application file for complete search history.

(56) References Cited

U.S. PATENT DOCUMENTS

| 6,721,795 | B1 | 4/2004 | Eldreth |
| 9,166,881 | B1 | 10/2015 | Gray |

(Continued)

FOREIGN PATENT DOCUMENTS

| CN | 1507598 A | 6/2004 |
| CN | 106487748 A | 3/2017 |

(Continued)

OTHER PUBLICATIONS

European Search Report for European Patent Application No. 17173424.7-1853 dated Nov. 23, 2017.

(Continued)

*Primary Examiner* — Brian P Cox
(74) *Attorney, Agent, or Firm* — Lempia Summerfield Katz LLC

(57) ABSTRACT

The invention relates to a method for transmitting analysis-relevant data from a transmitter (2), in which the analysis-relevant data is present, to a receiver (4), in which data analyses can be performed. In order to improve the method for transmitting analysis-relevant data from the transmitter (2) to the receiver (4), according to the invention one selection rule (30) to be applied to the analysis-relevant data is selected for a data transmission from a plurality of predefinable selection rules (26) for the selection of data to be transmitted from the analysis-relevant data, wherein the selection of the selection rule (30) to be applied for this data transmission is dependent on a data analysis applied to the data to be transmitted and on a state of the data link (6) between the transmitter (2) and the receiver (4). Moreover, the data to be transmitted is selected from the analysis-relevant data according to the selection rule (30) selected and the data to be transmitted is transmitted from the transmitter (2) to the receiver (4).

14 Claims, 1 Drawing Sheet

(56) References Cited

U.S. PATENT DOCUMENTS

| | | |
|---|---|---|
| 2014/0015689 A1 | 1/2014 | Folk |
| 2014/0156899 A1 | 6/2014 | Kristiansen |
| 2015/0148935 A1* | 5/2015 | Koshimaki .......... G05B 19/418 |
| | | 700/121 |

FOREIGN PATENT DOCUMENTS

| | | |
|---|---|---|
| CN | 106523928 A | 3/2017 |
| EP | 2661020 A2 | 11/2013 |

OTHER PUBLICATIONS

PCT International Search Report and Written Opinion of International Searching Authority dated Aug. 30, 2018 corresponding to PCT International Application No. PCT/EP2018/063436 filed May 23, 2018.

* cited by examiner

METHOD FOR TRANSMITTING ANALYSIS-RELEVANT DATA, TRANSMITTER AND SYSTEM

This application is the National Stage of International Application No. PCT/EP2018/063436, filed May 23, 2018, which claims the benefit of European Patent Application No. EP 17173424.7, filed May 30, 2017. The entire contents of these documents are hereby incorporated herein by reference.

BACKGROUND

The present embodiments relate to transferring analysis-relevant data from a transmitter, at which the analysis-relevant data is available, to a receiver, at which data analyses are able to be performed.

Nowadays, data is being transmitted from a transmitter to a receiver increasingly often. The data may then be saved, managed, and/or analyzed on the receiver side. In the device, large data volumes that usually are to be transferred to the data management unit via the network are conventionally generated. In order to transfer the data reliably, the data is generally compressed (e.g., redundant data is removed and/or a density of the data is increased).

If there is a pronounced temporary fluctuation in the available bandwidth of the network, however, then an uncontrolled data loss may occur. In this case, despite the compression, not all data is transmitted, and it is impossible to check which part of the data is not transmitted. An uncontrolled data loss may also result from strong interference in the transfer (e.g., in the form of noise). This uncontrolled data loss may make a meaningful analysis of the transferred data impossible in some circumstances.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved method for transferring analysis-relevant data from a transmitter to a receiver is provided.

A method, in which according to the present embodiments, for a data transfer, a selection rule to be applied to the analysis-relevant data is selected from a plurality of pre-definable selection rules for the selection of data to the transferred from the analysis-relevant data, is provided. The selection of the selection rule to be applied for this data transfer depends on a data analysis provided on the data to be transferred and on a status of the data connection between the transmitter and the receiver. According to the present embodiments, the data to be transferred is selected from the analysis-relevant data according to the selected selection rule. The data to be transferred is further transferred from the transmitter to the receiver.

One advantage of the present embodiments is that the best possible use may be made of the data connection that is available. According to the present embodiments, the selection of the selection rule to be applied depends on a data analysis provided on the data to be transferred, providing that the data to be transferred may be selected depending on the provided data analysis. In this way, it can be provided that data necessary for the provided data analysis may be transmitted.

The formulation "according to the selected selection rule" may be "as predefined by the selected selection rule".

In one embodiment, each selection rule of the plurality of selection rules predefines a selection method for the selection of data to be transferred from analysis-relevant data for a particular type of data analysis and for a particular status of the data connection between the transmitter and the receiver. This provides that the plurality of selection rules may be specific for a particular type of data analysis and for a particular status of the data connection between the transmitter and the receiver.

The plurality of selection rules for the selection of data to be transferred from the analysis-relevant data (hereinafter, "selection rules") are able to be predefined. In one embodiment, at least some of the selection rules are predefined. For example, the predefined portion of the selection rules may be predefined manually. Further, the predefined portion of the selection rules may be updated manually. In addition, selection rules may be added to and/or removed from the predefined portion of the selection rules manually (e.g., at any time).

In one embodiment, at least some selection rules of the plurality of selection rules (e.g., predefinable selection rules) are stored on the receiver side. For example, at least some of the plurality of selection rules (e.g., predefinable selection rules) may be stored on a data memory of the receiver. Further, at least some of the plurality of selection rules (e.g., predefinable selection rules) may be stored on a data memory that is connected to the receiver. For example, at least some of the plurality of selection rules (e.g., predefinable selection rules) may have been stored manually. The stored portion of the plurality of selection rules (e.g., predefinable selection rules) may be the previously mentioned predefined portion of the selection rules.

The data analysis provided on the data to be transferred (hereinafter, also "provided data analysis" or "data analysis") may be selected and/or predefined manually.

The status of the data connection between the transmitter and the receiver (hereinafter, also "status of the data connection") may be determined by the transmitter. Further, the status of the data connection may be determined by the receiver. Further, the status of the data connection may be determined by using software, for example.

In one embodiment, the status of the data connection (e.g., between the transmitter and the receiver) includes a transfer rate, a transfer speed, and/or a bandwidth.

The status of the data connection may, for example, be determined at a predefined point in time and/or after a predefined time interval. Additionally, the status of the data connection may be determined before the data transfer and/or during the transfer.

The selection of the selection rule to be applied may take place at least semi-automatically.

The selection rule to be applied may be selected on the receiver side. Further, the selected selection rule may be transferred from the receiver to the transmitter.

Further, at least some selection rules of the plurality of selection rules may be transferred from the receiver to the transmitter. For example, the selection rules transferred to the transmitter may be saved by the transmitter (e.g., in a data memory of the transmitter). The selection rule to be applied may be selected on the receiver side, and an item of information on which selection rule has been selected may be transferred to the transmitter. As an alternative or in addition, the selection rule to be applied may be selected on the transmitter side (e.g., by the transmitter, such as from the selection rules previously transferred to the transmitter).

In an embodiment, the selection rule to be applied is selected in two stages. This provides that the selection of the selection rule to be applied may be performed in a two-stage manner (e.g., in a first stage and a second stage).

In one embodiment, in the first stage (e.g., of the two-stage selection), a preselection is made from the plurality of selection rules depending upon the data analysis provided on the data to be transferred. In the second stage (e.g., of the two-stage selection), the selection rule to be applied may further be selected from the preselection, which, for example, was made in the first stage, depending on the status of the data connection between the transmitter and the receiver.

"Making a preselection from the plurality of selection rules" may be that some of the selection rules are preselected from the plurality of selection rules. The preselected selection rules may be a "preselection" (e.g., "pre-selection"). In one embodiment, the preselection includes at least two preselected selection rules.

The two stages of the two-stage selection may take place at separate times. In one embodiment, the first stage takes place before the second stage. The second stage may take place directly following the first stage or after a certain waiting time.

Additionally, the two stages of the two-stage selection may be performed in different instances. In principle, however, the two stages of the two-stage selection may also be performed in one and the same instance.

In one embodiment, the provided data analysis is selected and/or predefined before the first stage.

In one embodiment, the first stage of the two-stage selection is performed manually. This provides that the preselection from the plurality of selection rules may be made manually. In other words, the preselection may take place manually. The preselection may be made based on empirical values, for example.

In one embodiment, the preselection from the plurality of selection rules is stored on the receiver side after the first stage of the two-stage selection, and the second stage of the two-stage selection is then performed. This provides that it is possible for the preselection from the plurality of selection rules to only be stored on the receiver side. Selection rules that are not part of the preselection may not be stored, where appropriate (e.g., not on the receiver side). In principle, it is possible for other selection rules also to be stored on the receiver side in addition to the preselection. In one embodiment, at least the preselection from the plurality of selection rules is stored on the receiver side.

In one embodiment, the first stage of the two-stage selection is performed on the receiver side. For example, a user able to access the receiver is able to perform the first stage of the two-stage selection.

The plurality of selection rules may be stored on the receiver side before the first stage of the two-stage selection, and the two-stage selection (e.g., the first stage and the second stage) may then be performed. In this case too, the first stage of the two-stage selection may be performed manually.

In principle, the first stage of the two-stage selection may also be performed at least semi-automatically. In the situation in which the plurality of selection rules are stored on the receiver side before the two-stage selection is performed, then the preselection may be predefined, depending on the data analysis, for example. The preselection may then be made via the choice/predefinition of the provided data analysis (e.g., directly). In this way, the first stage of the two-stage selection of the selection rule to be applied may proceed at least semi-automatically.

Should the first stage of the two-stage selection be performed at least semi-automatically, then the first stage may also be performed on the transmitter side. This provides that, in the latter case, the preselection may be made on the transmitter side. In one embodiment, the plurality of selection rules are transferred from the receiver to the transmitter before the preselection on the transmitter side.

In one embodiment, the second stage of the two-stage selection is performed at least semi-automatically. For example, the second stage of the two-stage selection may be performed fully automatically (e.g., without intervention by an acting person or by the user).

The second stage of the two-stage selection may be performed on the receiver side. This provides that the selection rule to be applied may be selected from the preselection on the receiver side. For example, the second stage of the two-stage selection may be performed with the use of software stored on the receiver side. The software may be stored at the receiver. For example, the software may be stored on a data carrier of the receiver. It is further possible for the software to be stored on a data carrier that is connected to the receiver.

Further, the selection rule selected in the second stage (e.g., of the two-stage selection) may be transferred from the receiver to the transmitter.

Additionally, an item of information on which selection rule has been chosen in the second stage may be transferred from the receiver to the transmitter. In one embodiment, at least the preselection has been transferred from the receiver to the transmitter before the information is transferred.

Further, the preselection, which has been made in the first stage, for example, may be transferred from the receiver to the transmitter. The second stage of the two-stage selection may be performed on the transmitter side. This provides that the selection rule to be applied may be selected from the preselection on the transmitter side. For example, the second stage of the two-stage selection may be performed with the use of software stored on the transmitter side. The software may be stored at the transmitter. For example, the software may be stored on a data carrier of the transmitter. It is further possible for the software to be stored on a data carrier that is connected to the transmitter. For example, the transmitter may perform the second stage of the two-stage selection.

The method may be repeated several times. For example, the status of the data connection may be determined several times (e.g., at predefined points in time and/or after predefined time intervals). Should, during the determination of the status of the data connection, it be detected that the status of the data connection has changed by a predefined amount, then the first-mentioned data transfer may be terminated, and a further data transfer may be started. Even should the provided data analysis change, then the ongoing data transfer may be terminated, and a further data transfer may be started. Each of the data transfers may take place as per the method according to the present embodiments. This provides that a selection of the selection rule to be applied may take place in the same way in the further data transfer as in the first-mentioned data transfer.

The status of the data connection may be determined implicitly (e.g., for a previous data transfer that takes place before the first-mentioned data transfer). For example, in the previous data transfer, a particular status of the data connection may be assumed. If there is an error message in the previous data transfer, for example, then in the case of the first-mentioned data transfer, a reduced transfer rate, a reduced transfer speed, and/or a reduced bandwidth may be assumed for the status of the data connection, for example. The error message in the previous data transfer may appear, for example, if a request by the transmitter is not responded to by the receiver in the previous data transfer.

If there is another error message in the first-mentioned data transfer, then in the case of the further data transfer, a further reduced transfer rate, a further reduced transfer speed, and/or a further reduced bandwidth may be assumed for the status of the data connection, for example. If, however, there is no error message in the first-mentioned data transfer for a predefined period of time, then after this predefined period of time, it is possible for the further data transfer to start. In this, once more, the status of the data connection, which had been assumed in the previous data transfer (e.g., before the first-mentioned data transfer), is assumed.

One of the respective selection rules may contain a compression instruction, for example. One of the selection rules may further contain a prefiltering instruction. Additionally, one of the selection rules may contain a preprocessing instruction (e.g., preprocessing and/or stream processing). According to the preprocessing instruction, only outliers may be selected, for example. Further, according to the preprocessing instruction, data may be selected with the use of the Western Electric Rules, for example.

The transmitter may be connected to an installation or part of an installation. Values of a plurality of operating parameters of the installation may be present as data.

One of the respective selection rules may, for example, stipulate for which of the operating parameter(s) available values are to be transmitted. One of the selection rules may further stipulate from which part of the installation available values of the operating parameters are to be transmitted. Additionally, one of the selection rules may stipulate in which time interval available values for operating parameters are to be transmitted.

The selection rules may additionally have any other possible selection instructions.

The data to be transferred may be transferred in real time from the transmitter to the receiver. If values of a plurality of operating parameters of an installation (e.g., of the previously mentioned installation) are available as data, then the values may then be transmitted when the values occur (e.g., when the values are determined).

The receiver may be a data management unit, for example. For example, the receiver may be a server, a Cloud, and/or an Internet of Things service.

The present embodiments further relate to a transmitter for transferring analysis-relevant data to a receiver, in which data analyses are able to be performed. In one embodiment, the analysis-relevant data is available at the transmitter.

According to the present embodiments, the transmitter is configured to select the data to be transferred from the analysis-relevant data according to a selection rule to be applied to the analysis-relevant data, where the selection rule to be applied for a data transfer has been selected from a plurality of predefinable selection rules for the selection of data to be transferred from the analysis-relevant data. The selection of the selection rule to be applied for this data transfer is dependent on a data analysis provided on the data to be transferred and on a status of the data connection between the transmitter and the receiver. The transmitter is further configured to transfer the data to be transferred to the receiver.

The transmitter may be used to perform the previously mentioned method. For example, the transmitter may be the transmitter used in the previously mentioned method.

Additionally, the present embodiments relate to a system with a transmitter and a receiver for transferring analysis-relevant data from the transmitter, at which the analysis-relevant data is available, to a receiver, at which data analyses are able to be performed. In one embodiment, the transmitter is the previously mentioned transmitter.

According to the present embodiments, the system is configured, for a data transfer, to select a selection rule to be applied to the analysis-relevant data from a plurality of predefinable selection rules for the selection of data to be transferred from the analysis-relevant data. The selection of the selection rule to be applied for this data transfer is dependent on a data analysis provided on the data to be transferred and on a status of the data connection between the transmitter and the receiver. The transmitter is further configured to select the data to be transferred from the analysis-relevant data according to the selected selection rule and to transfer the data to be transferred to the receiver.

The system may be used to perform the previously mentioned method. For example, the transmitter may be the transmitter used in the previously mentioned method. Further, the receiver may be the receiver used in the previously mentioned method.

The description presented thus far of embodiments contains numerous features that are repeated in the individual subclaims, with several combined in some cases. However, these features may also be considered individually and combined to form sensible further combinations. For example, these features may be combined individually in each case and in any suitable combination with the method according to the present embodiments and the transmitter and/or system according to the present embodiments. Features of the method are thus also to be considered as formulated as object-based properties of the corresponding transmitter and/or the corresponding system, and vice versa.

Even if individual terms are used in the singular or in association with a quantifier in the description or in the claims, the extent of the invention is not to be restricted to the singular or the respective quantifier for these terms.

The above-described properties, features, and advantages of the present embodiments and the manner in which these are achieved will now become clearer and more intelligible in conjunction with the following description of the exemplary embodiments, which will be explained in detail making reference to the drawings. The exemplary embodiments serve to explain the invention and do not restrict the invention to the combination of features contained therein, including in relation to functional features. In addition, for this purpose, suitable features of the exemplary embodiments may also be considered explicitly in isolation, removed from an exemplary embodiment, and combined with any one of the claims.

DETAILED DESCRIPTION

Figure 1:
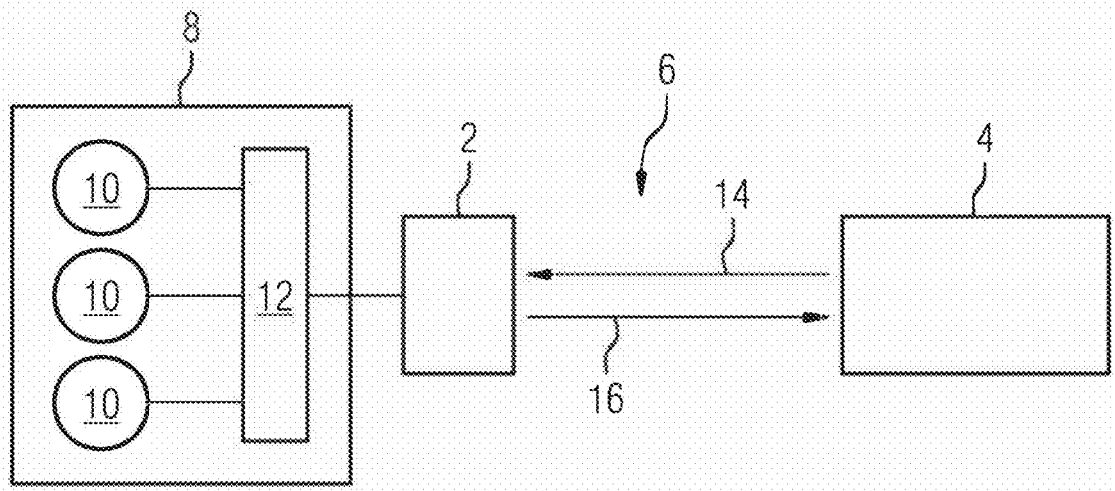
FIG. 1 shows one embodiment of a system with a transmitter and a receiver, where the transmitter is connected to an installation.

FIG. 1 schematically shows a transmitter 2 and a receiver 4 that are able to communicate with one another via a data connection 6. The data connection 6 may be cable-bound. The data connection 6 may further be cable-free. For example, the data connection 6 may be a radio connection.

The receiver 4 may be a data management unit, for example. For example, the receiver 4 may be a server, a Cloud, and/or an Internet of Things service.

The transmitter 2 is connected to an installation 8. The installation 8 includes a plurality of sensors 10 and a controller 12. Three sensors 10 are shown in FIG. 1 by way of example. In principle, however, the installation 8 may have any possible number of sensors 10. The sensors 10 are connected to the controller 12. The sensors 10 further ascertain measured values for certain installation parameters at predefined intervals. These measured values represent analysis-relevant data. The measured values may, for example, be transmitted to the transmitter 2 via the controller 12. The transmitter 2 is further able to pick up the measured values via the controller 12, for example. Consequently, the measured values are present in the transmitter 2 as analysis-relevant data.

Data analyses are to be performed at the receiver 4. The analysis-relevant data should at least partially be transferred from the transmitter 2 to the receiver 4.

A wide variety of data analyses may be provided. In a first data analysis, it should be analyzed, for example, when it is anticipated a certain component of the installation will need to be replaced. In a second data analysis, it should be analyzed, for example, which variables influence a performance of the installation. In a third data analysis, it should be analyzed, for example, which variables influence a quality (e.g., purity, precision, and/or the like) of parts produced with the installation. Other data analyses are may also be provided in addition or as an alternative.

A plurality of selection rules for the selection of data to be transferred from the analysis-relevant data are able to be predefined. At least some of the predefinable selection rules are predefined on the receiver side. For example, the predefined portion of the selection rules is predefined manually.

Each selection rule of the plurality of selection rules predefines a selection method for the selection of data to be transferred from analysis-relevant data for a particular type of data analysis and for a particular status of the data connection 6 between the transmitter 2 and the receiver 4.

For a data transfer, a selection rule 30 to be applied to the analysis-relevant data is selected from the plurality of selection rules 26. In this context, the selection of the selection rule 30 to be applied for this data transfer depends on a data analysis provided on the data to be transferred and on a status of the data connection 6.

It is manually predefined which data analysis is provided.

Figure 2:
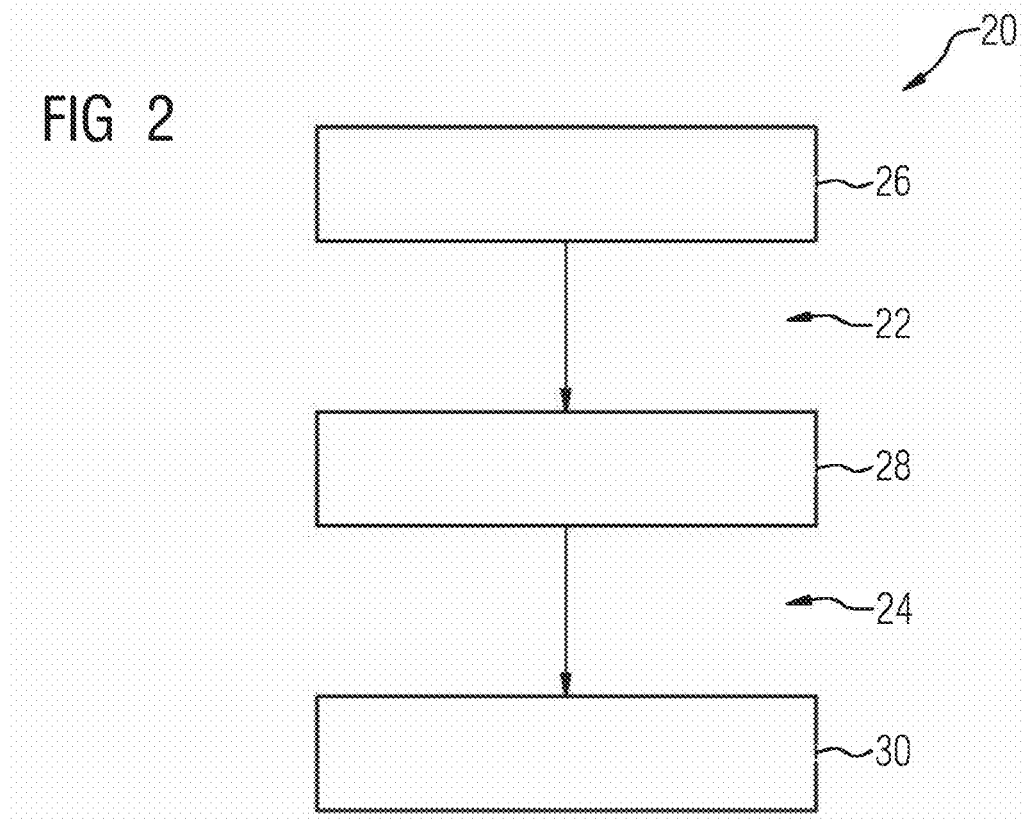
FIG. 2 shows a schematic flow diagram of one embodiment of a two-stage selection.

In this example, the selection rule to be applied is selected in two stages (e.g., in a first stage 22 and in a second stage 24). The two-stage selection is shown schematically in the flow diagram 20 in FIG. 2.

In the first stage 22, a preselection 28 is made from the plurality of selection rules 26 (e.g., predefinable selection rules) depending on the data analysis provided on the data to be transferred. For example, this preselection 28 may be made manually. At least the preselection 28 from the plurality of selection rules 26 is stored on the receiver side. For example, the preselection 28 from the plurality of selection rules 26 may be stored on a data memory of the receiver 4. In one embodiment, the first stage 22 takes place on the receiver side (e.g., the preselection 28 may be made on the receiver side).

The status of the data connection 6 between the transmitter 2 and the receiver 4 is determined. For example, the status of the data connection may include a transmission rate, a transfer speed, and/or a bandwidth. The status of the data connection 6 may be determined by the transmitter 2 and/or by the receiver 4. In one embodiment, the status of the data connection 6 is determined before the respective data transfer.

In the second stage 24 of the two-stage selection, the selection rule 30 to be applied is selected from the preselection 28, which was made in the first stage 22, depending on the status of the data connection 6 between the transmitter 2 and the receiver 4.

The second stage 24 may be performed by the receiver 4, for example. This provides that the selection rule 30 to be applied may be selected on the receiver side. The selected selection rule, which corresponds to the selection rule 30 to be applied, may be transferred from the receiver 4 to the transmitter 2. It is further possible for only an item of information on which selection rule 30 has been selected to be transferred from the receiver 4 to the transmitter 2. In the latter case, the preselection 28 from the plurality of selection rules 26 may have been transferred from the receiver 4 to the transmitter 2 beforehand.

In FIG. 1, an arrow 14 that points from the receiver 4 to the transmitter 2 is shown. This arrow 14 clarifies the transfer of the selection rule to be applied or the transfer of the information on which selection rule has been selected, from the receiver 4 to the transmitter 2 in each case. In addition or as an alternative, this arrow 14 clarifies the transfer of the preselection 28 from the receiver 4 to the transmitter 2.

The second stage 24 may also be performed by the transmitter 2. The preselection 28 may be transferred from the receiver 4 to the transmitter 2, and the transmitter 2 selects the selection rule 30 to be applied from the preselection 28.

The transmitter 2 (FIG. 1) selects the data to be transferred from the analysis-relevant data according to the selected selection rule 30. The data to be transferred is then transferred from the transmitter 2 to the receiver 4. The transfer of the data to be transferred is shown in FIG. 1 by an arrow 16, which points from the transmitter 2 to the receiver 4.

The status of the data connection 6 may also be determined during a data transfer. If, during the determination of the status of the data connection, it is detected, for example, that the status of the data connection 6 has changed by a predefined amount, then the previously mentioned data transfer may be terminated, and a further data transfer may be started. The status of the data transfer may further be determined implicitly, for example, in the form of an error message during the previously mentioned data transfer. Should the error message appear during the previously mentioned data transfer, then it may be assumed that the status of the data connection has deteriorated by a predefined amount. Should the error message appear during the previously mentioned data transfer, then the previously mentioned data transfer may additionally be terminated, and a further data transfer may be started.

Even if another data analysis is provided or selected, then the previously mentioned data transfer may be terminated, and a further data transfer may be started. Each of the data transfers may take place as per the method according to the present embodiments. This provides that a selection of the selection rule to be applied may take place in the same way in the further data transfer as in the previously mentioned data transfer.

If the status of the data connection 6 only changes by a certain amount, and the provided data analysis remains unaltered, then it is possible for only the second stage of the two-stage selection to be performed in the further data transfer. This provides that the first stage may be skipped in this case during the further data transfer, as the first stage would lead to the same preselection.

Using the present embodiments, the best possible use is made of the data connection available, and the data to be transferred is selected depending on the data analysis provided. In this way, it may be provided that data necessary for the provided data analysis may be transmitted.

Although the invention has been illustrated and described in greater detail by the exemplary embodiments, the invention is not limited by the examples disclosed, and the person skilled in the art will be able to derive other variations on this basis without moving beyond the scope of protection of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for transferring analysis-relevant data from a transmitter, at which the analysis-relevant data is available, to a receiver, at which data analyses are performable, the method comprising:
    selecting, for a data transfer, a selection rule to be applied to the analysis-relevant data from a plurality of predefinable selection rules for selection of data to be transferred from the analysis-relevant data, wherein selecting the selection rule to be applied for the data transfer is dependent upon a data analysis provided on the data to be transferred and on a status of the data connection between the transmitter and the receiver;
    selecting the data to be transferred from the analysis-relevant data according to the selected selection rule; and
    transferring the data to be transferred from the transmitter to the receiver,
    wherein the selection rule to be applied is selected in two stages, and
    wherein, in a first stage of the two stages, a preselection is made from the plurality of selection rules depending upon the data analysis provided on the data to be transferred and, in a second stage of the two stages, the selection rule to be applied is selected from the preselection depending upon the status of the data connection between the transmitter and the receiver.

2. The method of claim 1, wherein each selection rule of the plurality of selection rules predefines a selection method for the selection of data to be transferred from analysis-relevant data for a particular type of data analysis and for a particular status of the data connection between the transmitter and the receiver.

3. The method of claim 1, wherein at least some selection rules of the plurality of selection rules are stored on the receiver side.

4. The method of claim 1, wherein the status of the data connection between the transmitter and the receiver includes a transfer rate, a transfer speed, a bandwidth, or any combination thereof.

5. The method of claim 1, wherein the preselection from the plurality of selection rules is stored on the receiver side after the first stage of the two-stage selection, and the second stage of the two-stage selection is then performed.

6. The method of claim 1, wherein the plurality of selection rules are stored on the receiver side before the first stage of the two-stage selection, and the two-stage selection is then performed.

7. The method of claim 1, wherein the first stage of the two-stage selection is performed on the receiver side.

8. The method of claim 1, wherein the first stage of the two-stage selection is performed manually.

9. The method of claim 1, wherein the second stage of the two-stage selection is performed at least semi-automatically.

10. The method of claim 1, wherein the second stage of the two-stage selection is performed on the receiver side.

11. The method of claim 1, wherein the preselection is transferred from the receiver to the transmitter, and the second stage of the two-stage selection is performed on the transmitter side.

12. The method of claim 1, wherein the data to be transferred is transferred from the transmitter to the receiver in real time.

13. A transmitter for transferring analysis-relevant data to a receiver, in which data analyses are performable, wherein the analysis-relevant data is present at the transmitter, the transmitter comprising:
    a processor configured to:
        select data to be transferred from the analysis-relevant data according to a selection rule to be applied to the analysis-relevant data, wherein, for a data transfer, the selection rule to be applied has been selected from a plurality of predefinable selection rules for the selection of data to be transferred from the analysis-relevant data, wherein the selection of the selection rule to be applied for this data transfer depends on a data analysis provided on the data to be transferred and a status of the data connection between the transmitter and the receiver,
    wherein the transmitter is configured to transfer the data to be transferred to the receiver,
    wherein the selection rule to be applied is selected in two stages, and
    wherein, in a first stage of the two stages, a preselection is made from the plurality of selection rules depending upon the data analysis provided on the data to be transferred and, in a second stage of the two stages, the selection rule to be applied is selected from the preselection depending upon the status of the data connection between the transmitter and the receiver.

14. A system for transferring analysis-relevant data from a transmitter, at which analysis-relevant data is available, to a receiver, at which data analyses are performable, the system comprising:
    the transmitter and the receiver;
    wherein the system is configured to select, for a data transfer, a selection rule to be applied to the analysis-relevant data from a plurality of predefinable selection rules for the selection of data to be transferred from the analysis-relevant data,
wherein the selection of the selection rule to be applied for the data transfer depends on a data analysis provided on the data to be transferred and on a status of a data connection between the transmitter and the receiver,
wherein the transmitter is configured to:
   select the data to be transferred from the analysis-relevant data according to the selected selection rule; and
   transfer the data to be transferred to the receiver,
wherein the selection rule to be applied is selected in two stages, and
wherein, in a first stage of the two stages, a preselection is made from the plurality of selection rules depending upon the data analysis provided on the data to be transferred and, in a second stage of the two stages, the selection rule to be applied is selected from the preselection depending upon the status of the data connection between the transmitter and the receiver.

\* \* \* \* \*